United States Patent
Guch, Jr. et al.

(10) Patent No.: US 6,580,732 B1
(45) Date of Patent: Jun. 17, 2003

(54) MULTIPLE MODE LASER

(75) Inventors: Steve Guch, Jr., Mount Dora, FL (US);
Charles L. Stonecypher, Asheville, NC (US); William M. Roberts, Apopka, FL (US); Ronald R. Selleck, Orlando, FL (US)

(73) Assignee: Litton Systems, Inc., Woodland Hills, CA (US)

( * ) Notice: Subject to any disclaimer, the term of this patent is extended or adjusted under 35 U.S.C. 154(b) by 232 days.

(21) Appl. No.: 09/617,246

(22) Filed: Jul. 14, 2000

(51) Int. Cl.[7] .............................................. H01S 3/098
(52) U.S. Cl. ........................................ 372/18; 372/71
(58) Field of Search ..................................... 372/18, 71

(56) References Cited

U.S. PATENT DOCUMENTS

| | | | |
|---|---|---|---|
| 3,423,695 A | | 1/1969 | Boyden |
| 3,521,188 A | | 7/1970 | Sooy |
| 3,699,474 A | | 10/1972 | Landry |
| 3,970,967 A | | 7/1976 | Iliff |
| 4,019,156 A | | 4/1977 | Fountain et al. |
| 4,176,327 A | | 11/1979 | Wayne et al. |
| 4,375,684 A | * | 3/1983 | Everett .......................... 372/18 |
| 4,528,668 A | | 7/1985 | Wayne et al. |
| 4,660,205 A | * | 4/1987 | Harter et al. .................. 372/18 |
| 4,764,930 A | | 8/1988 | Bille et al. |
| 5,197,074 A | | 3/1993 | Emmons, Jr. et al. |
| 5,488,619 A | * | 1/1996 | Injeyan et al. ................. 372/12 |
| 5,555,254 A | * | 9/1996 | Injeyan et al. ................. 372/33 |
| 5,721,749 A | | 2/1998 | Holleman et al. |
| 5,740,194 A | | 4/1998 | Uchida et al. |
| 5,917,843 A | * | 6/1999 | Greene .......................... 372/19 |
| 6,351,579 B1 | * | 2/2002 | Early et al. .................... 385/18 |

* cited by examiner

*Primary Examiner*—Paul Ip
*Assistant Examiner*—Leith Al-Nazer
(74) *Attorney, Agent, or Firm*—William M. Hobby, III

(57) ABSTRACT

A laser apparatus is described having multiple modes of operation using intracavity optical switching within a laser resonator. The laser resonator has a solid state gain medium and one or more optical switches located between a pair of end reflectors. The pump for the gain medium has controlled duration to allow varying the pumping energy and pulse repetition rate. The laser has a Q-switched mode for generating energy from the laser resonator at a fixed level of outcoupling when the laser pump is operated to produce a range of predetermined pulse, rates and durations. The laser also has a cavity dumped mode of operation in which the laser pump is operated to produce a second range of predetermined higher pulse repetition rates and shorter pulse durations so that the pulse energy, rate and duration are selected by first Q-switching with essentially no outcoupling and then rapidly cavity dumping all the optical energy in the resonator. Intracavity optical switching of the laser resonator is used to achieve the two distinct modes of operation, the first being conventional Q-switched operation with pulse width equivalent to several cavity round trip times and the second being Q-switched cavity, dumped operation with pulse width equivalent to about one cavity round trip time. Use of this apparatus with external frequency shifting optics is also described.

9 Claims, 1 Drawing Sheet

MULTIPLE MODE LASER

BACKGROUND OF THE INVENTION

The present invention relates to lasers and especially to a laser having multiple pulse duration and pulse rate modes of operation.

The laser resonator considered has a solid state laser gain medium mounted between resonator end reflectors and has optical switching elements located therein. The laser resonator provides two distinct modes of operation, conventional Q-switched operation, with pulse width equal to several cavity round-trip times, and Q-switched cavity dumped operation, with pulse width equal to approximately one cavity round-trip time. The pumping source is controlled along with the switching techniques to provide a single laser operable in two distinct modes at widely varying pulse rates and excellent efficiency.

Prior U.S. patents of interest may be seen in the Uchida et al. U.S. Pat. No. 5,740,194 for a solid state laser apparatus in which a Nd:YAG laser varies the number of pumping LED's to adjust the pulse width time and spacing. This patent controls relatively long pulse lasers by varying the pumping characteristics and time to change the output and does not change the dynamics of the laser pulse buildup and would not be effective in very short duration ranges typical of Q-switched pulses. The U.S. Patent to Holleman et al. U.S. Pat. No. 5,721,749 provides a laser pulse profile control by modulating relaxation oscillations and controls the timing and form of pulses of a solid state laser with an acousto-optic modulator. By varying the duty cycles of laser diodes, the internal dynamics of a multi-pulsed relaxation oscillator is used to obtain desired characteristics of amplitude and pulse duration. This patent relies on relaxation oscillations and works with gain switched pulses rather than Q-switched pulses. There is no capability for achieving very short pulses. The Injeyan et al. patent, U.S. Pat. No. 5,488,619, is a Q-switched micro-laser having an array of individual intracavity Q-switches and uses multiple parallel lasers to generate small pulses which may be combined to form a generally incoherently single output beam. The Emmons, Jr. et al. patent, U.S. Pat. No. 5,197,074, is for a laser system with multi-function intraresonator loss modulation to form output pulses of selectible duration and controls the relative amplitudes of pulses within a multipulse range. The Bille et al. patent, U.S. Pat. No. 4,764,930, is a multi-wavelength laser source which provides a plurality of pulsed laser beams using a plurality of LED's and uses a complex mode locked laser and grating or prism pulse compressor to generate short pulses. The Wayne et al. patent, U.S. Pat. No. 4,528,668, is a programmable multifunction laser which selectively uses Q-switch pulses and cavity dumped pulses as a means to achieve pulses of significantly different temporal width. It does not use controlled pump-pulse duration to control the stored energy in the gain medium at the time of Q-switching, as in the present invention. It also does not have the ability to either Q-switch conventionally or to allow Q-switching to occur with no out coupling followed by rapid cavity dumping when used in conjunction with control of the pulse duration to select pulse energy pulse rate and pulse duration over relatively broad ranges and with a high laser efficiency. This patent relates to gas lasers rather than the solid state lasers of the present invention. The Wayne et al. patent, U.S. Pat. No. 4,176,327, is a method for cavity dumping a Q-switched laser with varying pulse frequency of a gas laser. It is similar to the Wayne et al. '668 patent. The Fountain et al. patent, U.S. Pat. No. 4,019,156, is for a dual Q-switch Nd:YAG laser with active and passive Q-switches to produce dual modulation for differing pulse durations. The combination passive-active mode locked configuration provides some control over pulse widths but in a range which is much shorter than in the present invention. The Iliff patent, U.S. Pat. No. 3,970,967, is for a ultrafast light shutter utilizing two sets of Pockels cell polarizer combinations to select laser pulse duration and does not deal with the control of laser dynamics, as in the present invention. The Landry patent, U.S. Pat. No. 3,699,474, is for a multiple beam laser obtained by sequential Q-switches. Spatially separated laser outputs are derived from a single laser gain medium leading to independent incoherent outputs. The Sooy patent, U.S. Pat. No. 3,521,188, is a double Q-switched laser with self-mode locked intracavity loss module which will generate short pulses but which does not provide true multi-function control of the dynamics of the laser to achieve different pulse durations and energies. One Q-switch holds back oscillation in the cavity until pumped to a higher inverted state and a second Q-switch operates to switch out of the cavity a single pulse. The Boyden patent, U.S. Pat. No. 3,423,695, is for a dual Q-switched laser having one active and one passive Q-switch to generate an output pulse and to clean up and improve the timing jitter of a laser output pulse.

The present invention uses intracavity laser dynamics in a laser resonator to achieve two distinct modes of operation including a conventional Q-switched operation with a predetermined pulse width and a Q-switched cavity dumped operation with a different pulse width controlling the pumping source and employing switching techniques to allow a single laser to produce efficient, relatively high energy, long duration pulses at short pulse rates, or alternatively, low energy short duration pulses at high pulse rates.

SUMMARY OF THE INVENTION

A laser apparatus achieves multiple pulse duration and pulse rate modes of operation using intracavity optical switching it a laser resonator. The laser resonator has a solid state gain medium located between a pair of end reflectors and one or more optical switches. The laser pump uses a pump source which can be varied in pulse duration to allow multiple output pulse rates. The laser has a Q-switched mode for out coupling laser energy from the laser resonator at a constant, predetermined outcoupling fraction in one mode of operation, producing a pulse duration equal to several cavity round-trip times. The laser also has cavity dumping capability for coupling the Q-switched laser energy out of the laser resonator in a second, short pulse mode of operation in which the laser pump is operated to produce a second predetermined pulse rate. No outcoupling is allowed to occur initially in this mode so that a pulse can build rapidly and efficiently extract energy from the gain medium. After essentially all the stored energy is extracted from the laser medium, it is cavity-dumped in approximately one cavity round-trip time. Intracavity optical switching of the laser resonator is used to achieve the two distinct modes of operation: conventional Q-switched operation, with pulse width equivalent to several cavity round trip times; and Q-switched cavity dumped operation, with pulse width equivalent to about one cavity round trip time.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

The present invention uses intracavity optical switching within a laser resonator 10 to achieve two distinct modes of operation: 1) conventional Q-switched operation with pulsewidth equivalent to several cavity round-trip times; and (2) Q-switched cavity dumped operation with pulsewidth equivalent to about one cavity round-trip time. By controlling the pumping source appropriately and employing the switching technique, a single laser (e.g. pulsed Nd:YAG) may very efficiently produce relatively high energy, long-duration pulses at modest pulse rates, such as 150 mJ, 20 ns, 10–20 Hz pulses, or low energy, short duration pulses at high pulse rates, such as ~30 mJ, 5 ns, >100 Hz pulses.

Figure 1:
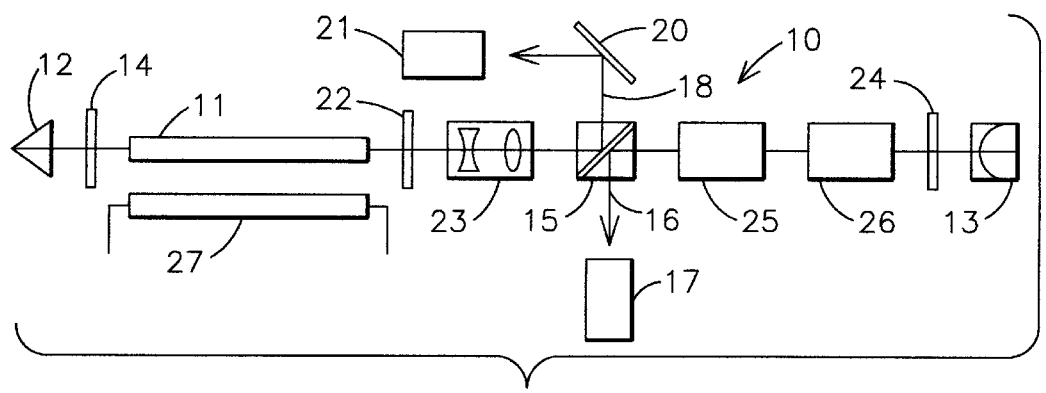
FIG. 1 is a resonator schematic in accordance with the present invention for producing a single output beam axis with two pulse modes.

Referring to FIG. 1 of the drawings, a laser 10 includes a laser resonator having a gain medium or laser rod 11, such as Nd:YAG, positioned between a pair of porro prism end reflectors 12 and 13. The resonant cavity has a polarizer 15 positioned therein having a cavity dumped outcoupling 16 towards detector 17 and a Q-switched outcoupling 18 directed towards a mirror 20 and to a detector 21. The optical cavity also has a ⅗ wave birefringence compensation waveplate 14 and a reflectivity waveplate 22 which sets the amount of energy coupled out of the resonator at polarizer 15. A compensation scope 23 is placed in the cavity to control the net optical power of the beam egressing from the laser rod 11. A ⅗ wave holdoff plate 24 holds off the Q-switching of the laser. A pair of lithium niobate Pockels cells 25 and 26 are mounted within the cavity in the particular embodiment described herein. Alternately, a single cell can be used, but this requires a more complex electronic driver. Pockels cell 25 turn-on time may be approximately 100 ns while Pockels cell 26 turn-on time may be approximately 5 ns. These Pockels cells rotate the beam polarization for Q-switching or cavity dumping in accordance with the polarizer 15 for producing the output from the laser. A laser pump 27 is mounted adjacent the laser rod 11 and in the preferred embodiment uses a laser diode pump system for pumping the laser rod. Such diodes can be easily controlled using field effect transistors to vary the rate and duration of the laser pumping light. Other pumping sources can of course be used without departing from the spirit and scope of the invention.

Figure 2:
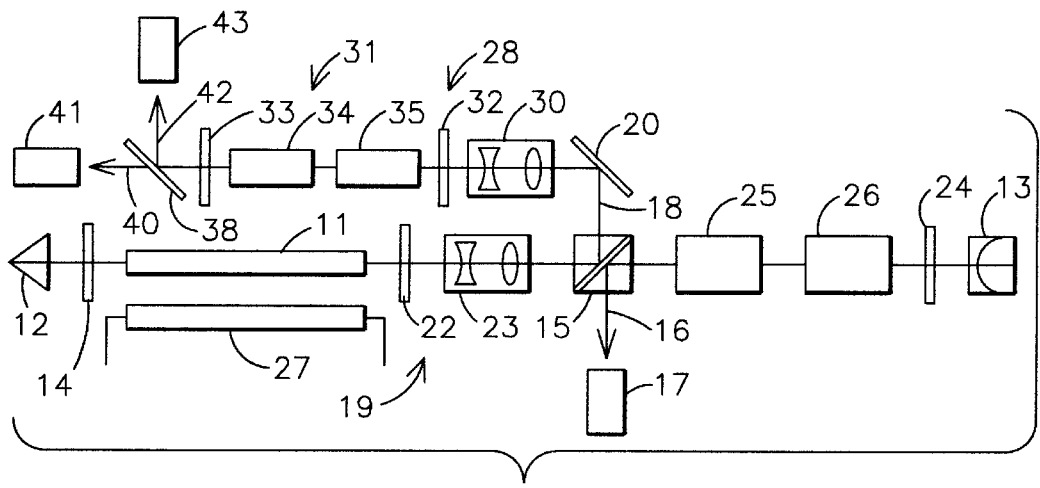
FIG. 2 is a resonator schematic for producing two output beam lines, one of which is frequency shifted.

Referring to FIG. 2, the same laser cavity as illustrated in FIG. 1 has the Q-switched output 18 applied to the mirror 20 which in turn directs the beam into an optical parametric oscillator or OPO 28 through compensator scope 30. The OPO 28 has a resonant cavity 31 formed between reflectors 32 and 33 with reflector 33 serving as the output coupler. The OPO cavity 31 may have multiple non-linear crystals 34 and 35 therein both of which can be KTP crystals. Two crystals are shown but it will be understood that any number from one to more than three may be employed. The frequency shifted output 36 of the OPO 28 is applied against a dichroic filter 38 which directs the shifted beam 40 against the detector 41 and the residual pump beam 42 against the beam dump 43. Thus, the laser of FIG. 2 can produce two output beam lines. One may be a long pulse 20 ns modest PRF of about 20 Hz at 1.06 μm onto the detector 17 and the second beam 40 may be a short pulse of about 5 ns with a high PRF in the one hundreds of Hz at 1.57 μm so that the short pulse output from the ND:YAG laser is converted to an eye safe wavelength using the KTP optical parametric oscillator.

Figure 3:
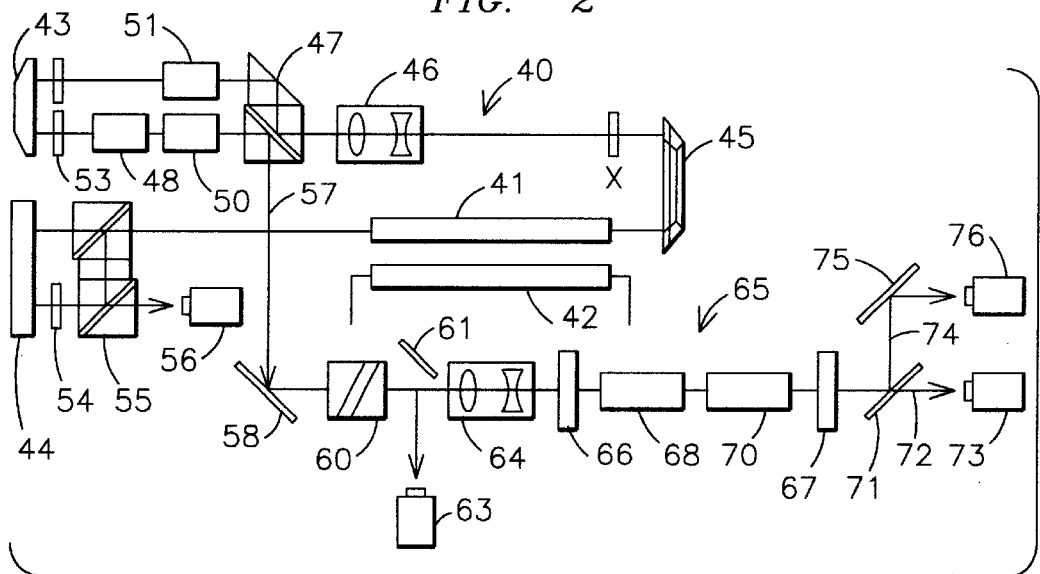
FIG. 3 is another embodiment of a resonator schematic for producing two output beams, one of which is frequency shifted.

Turning to FIG. 3, another laser resonator is provided for producing two output beams and has the laser resonator 40 formed with an optical parametric oscillator 65. The laser resonator 40 has an active medium 41, such as Nd:YAG, mounted in the cavity and driven by a laser pump 42 which may be a plurality of diode lasers. The laser rod 41 is mounted between plural prism reflectors 43 and 44 and has a folding prism 45. The laser resonator includes a compensating scope 46, a polarizer 47, and three separate lithium niobate Pockels cells 48, 50 and 51. The folding optics reflector 45 folds the light energy within the cavity. The Pockels cell 48 may be a 5 ns Pockels cell while the Pockels cell 50 and 51 can each be 100 ns Pockels cells. The cavity also has a pair of ⅗ wave birefringence plates 52 and 53 and a reflectivity waveplate 54 mounted adjacent a polarizer 55. An output from the polarizer 55 is directed into the detector 56 while the outcoupling of the laser beam 57 is directed against a mirror 58 and onto a pair of alignment Risleys 60. The beam is subsequently directed through a compensating scope 64 and into an optical parametric oscillator 65 having a pair of reflectors 66 and 67 forming a cavity having non-linear crystals 68 and 70 therein. The non-linear crystals can be KTP crystals or any other non-linear crystal desired. The output from the OPO 65 is directed against a dichroic filter 71 which passes the frequency shifted beam 72 to the detector 73 and the residual pump beam 74 onto a mirror 75 and then onto the beam dump 76. The resonator, as shown in FIG. 3, produces two output beams, one of which may be a long pulse 20 ns modest PRF of 20 Hz at 1.06 μm at the detector 56. The second output beam may be a short pulse of 5 ns having a high PRF of hundreds of hertz at 1.57 μm at the detector 76. A short pulse output from the Nd:YAG laser is converted to an eye-safe wavelength using the dual crystal KTP optical parametric oscillator 65. Detailed operating principles for the resonators shown in FIGS. 1, 2 and 3 and described above are discussed in the paragraphs to follow.

Returning to the most basic configuration shown in FIG. 1, to operate in a Q-switched mode, the gain medium 11 is optically pumped by the pump 27 for a period which achieves relatively high energy storage and optical gain. For Nd:YAG, single pass gains of ~1.5–10X are typical. With resonator outcoupling fixed, typically in the range of 20–70%, the optical switch is rapidly opened and Q-switching occurs. The energy stored within the gain medium 11 is transformed by spontaneous and stimulated emission into intracavity optical energy which is partially extracted on each reflective pass through the resonator 10, forming the beam output. Because the outcoupling is fixed, the rate at which the intracavity energy builds up is limited. Similarly, because the energy is extracted from the resonator 11 by partial outcoupling on each reflective pass, several two-way passes through the resonator are required to extract the intracavity energy as the output beam. For Q-switched Nd:YAG lasers producing ~150 mJ output in ~80 cm long resonators, typical pulsewidths are 20 nsec. These lasers are often pulsed at 10–20 Hz, particularly for military applications.

To operate in a short pulse mode, subtle changes are made in the laser operating mode. Instead of optically pumping at a high rate over a long duration to generate large output pulse energies, the gain medium 11 is pumped over a period tailored to the desired pulse rate and energy. During this pump period, laser oscillation is prevented by ensuring that the Pockels cell serving as the intracavity optical Q-switch is maintained in a high loss or "Off" mode. After the desired energy storage is achieved, usually 1/3–1/10 of a conventional Q-switched laser, the optical Q-switch is opened to allow the intracavity optical energy to build up in this mode without allowing any significant power to escape. Instead of using fixed outcoupling at some finite value, resonator outcoupling is initially minimized to allow the laser 10 to resonate and extract stored energy efficiently even at very low pump levels. This mode allows the rapid extraction of the energy stored in the laser medium and its transformation of optical energy within the circulating field of the resonator. The Pockels cell used as the optical cavity dumping switch is then actuated to outcouple this optical energy in a single round-trip through the resonator, forming a very short pulse. In this mode, outputs of 20 mJ at typical pulsewidths of 5 nsec and pulse rates of >100 Hz are achievable from the same resonator used for conventional Q-switching, as described in the previous paragraph.

It is important to note that if the Q-switched cavity-dumped mode were not present, the efficiency of the laser operating at high pulse rates and low energies would be low or zero. By Q-switching the resonator while in a nearly lossless state, however, the laser will be extracting energy while significantly above oscillation threshold, providing outstanding efficiency which would be unachievable at a fixed outcoupling value.

In the simplest embodiments of this dual-mode concept, a 1.06 $\mu$m resonator contains all the optics needed to generate both long and short pulse outputs as seen in FIG. 1. In this configuration, the output beam axes (but not direction unless other optics are added) and divergence are identical between the two modes. Other possible configurations, such as shown in FIGS. 2 and 3, exist with particular advantages for certain applications, such as the use of the short pulse beam as a pump for a frequency converter, which may be located outside the 1.06 $\mu$m resonator. All geometries share the common benefit that the resonator lengths and configurations are maintained exactly the same as the operating mode is switched, so that laser beam quality and pointing direction are not affected by the switching process.

One key feature is the control of pump energy. The ability to pump the gain medium 11 to different levels of excitation between the two modes, e.g. for varying time periods at constant pump level before initiating optical switches is key to this approach. While this may be achieved with flashlamp pumped systems by use of two separate pulse forming networks or using complex modulator geometries, such as pulse truncation using high voltage transistors, the pump energy control is much easier to achieve in a diode pumped systems using FET-switched, constant-current pumping from large energy storage capacitors which are never significantly discharged during pumping.

Another key feature is the dual-mode optical switching/outcoupling. Control of the output coupling using, for example, electro-optical crystals, accurate switch timing, using either preset time delays or by sensing optical pulse levels within the resonator, and rapid switching, using, for example, very high speed/voltage switching of a Pockels cell, are used to achieve the desired performance.

The use of Nd:YAG lasers employing electro-optical switching has been described herein but other solid state lasers, such as alexandrite or Nd:Glass, may also be used.

The advantages of the current invention over prior approaches are in the reduced size, weight and cost of the laser. The number of lasers and components is reduced from prior lasers to provide a more affordable, packagable approach. Improved stability of beam divergence and pointing direction are also obtained. The present invention shares resonator elements located on a common optical structure in both modes, reducing the potential for misalignment. It should be clear at this time that a laser having two modes of operation has been described, but the present invention is not to be construed as limited to the forms shown which are to be considered illustrative rather than restrictive.

We claim:

1. A laser having multiple modes of operation produced from a single laser resonator comprising:
    a laser resonator having a solid state gain medium located between a pair of end reflectors;
    a laser pump positioned to pump said laser resonator solid state gain materials and having controllable pulse durations;
    Q-switching means located in said laser resonator for outcoupling said laser energy from said laser resonator in first mode of operation when said laser pump is operated to produce one range of predetermined pulse repetition rates and durations; and
    cavity dumping means located in said laser resonator for dumping laser energy from said laser resonator in a second mode of operation when said laser pump is operated to produce a second range of higher predetermined pulse repetition rates and shorter pulse durations; whereby pulse energy, pulse rate, and pulse duration are selected by controlling said laser pump pulse repetition rate and the cavity dumping and Q-switching within said laser resonator, and whereby the Q-switched pulse is allowed to build up without significant outcoupling prior to being cavity-dumped.

2. A laser having multiple modes of operation in accordance with claim 1 in which Q-switch means includes a Pockels cell and a polarizing beam splitter to extract its output.

3. A laser having multiple modes of operation in accordance with claim 2 in which cavity dumping means includes a Pockels cell and a polarizing beam splitter to extract its output.

4. A laser having multiple modes of operation in accordance with claim 2 in which said Q-switches and cavity dumps are lithium niobate Pockels cells.

5. A laser having multiple modes of operation in accordance with claim 3 in which each of said pair of laser reflectors is a porro-prism reflector.

6. A laser having multiple modes of operation in accordance with claim 1 in which said laser resonator has three niobate Pockels cells therein selectively activated to produce two output beams from said laser resonator.

7. A laser having multiple modes of operation in accordance with claim 1 including an optical parametric oscillator positioned to receive the output from said cavity dumping means to produce two output beams from said laser.

8. A laser having multiple modes of operation in accordance with claim 7 in which said OPO has a plurality of non-linear crystals therein to optimize the laser efficiency.

9. A laser having multiple modes of operation in accordance with claim 3 including an optical parametric oscillator positioned to receive the output from said cavity dumping means to produce two output beams from said laser.

* * * * *